US 7,694,239 B2

(12) United States Patent
Swain et al.

(10) Patent No.: US 7,694,239 B2
(45) Date of Patent: Apr. 6, 2010

(54) SELECTION AND DESELECTION OF OBJECTS AT MULTIPLE LEVELS OF A HIERARCHY

(75) Inventors: Alex Swain, Austin, TX (US); Michael W. Yaklin, Austin, TX (US); Yasmin Youssef, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1110 days.

(21) Appl. No.: 11/338,197

(22) Filed: Jan. 23, 2006

(65) Prior Publication Data

US 2007/0185894 A1 Aug. 9, 2007

(51) Int. Cl.
*G06F 3/048* (2006.01)
(52) U.S. Cl. .................. 715/854; 715/816; 715/825; 715/845
(58) Field of Classification Search .................. 715/783, 715/816, 825, 845, 854
See application file for complete search history.

(56) References Cited

U.S. PATENT DOCUMENTS

| 5,671,398 | A | 9/1997 | Neubauer |
| 5,864,868 | A * | 1/1999 | Contois ................... 707/104.1 |
| 5,900,879 | A | 5/1999 | Berry et al. |
| 6,054,989 | A | 4/2000 | Robertson et al. |
| 6,236,400 | B1 * | 5/2001 | Guerrero ................... 715/841 |
| 6,243,093 | B1 | 6/2001 | Czerwinski et al. |
| 6,373,484 | B1 | 4/2002 | Orell et al. |
| 6,380,947 | B1 * | 4/2002 | Stead ........................ 345/645 |
| 6,499,026 | B1 | 12/2002 | Rivette et al. |
| 6,731,312 | B2 * | 5/2004 | Robbin ...................... 715/792 |
| 6,775,659 | B2 | 8/2004 | Clifton-Bligh |
| 6,868,412 | B2 | 3/2005 | Gatehouse et al. |
| 6,944,830 | B2 | 9/2005 | Card et al. |
| 7,437,676 | B1 | 10/2008 | Magdum et al. |
| 2003/0050915 | A1 | 3/2003 | Allemang et al. |
| 2004/0015468 | A1 | 1/2004 | Beier et al. |
| 2004/0268451 | A1 * | 12/2004 | Robbin et al. ............... 715/738 |

(Continued)

FOREIGN PATENT DOCUMENTS

EP 0 610 581 8/1994

(Continued)

OTHER PUBLICATIONS

Miser, Brad et al. "iPod+ iTunes Starter Kit". Que, Dec. 1, 2004.*

(Continued)

*Primary Examiner*—Stephen S Hong
*Assistant Examiner*—Tyler J Schallhorn
(74) *Attorney, Agent, or Firm*—Janaki K. Davda; Konrad Raynes & Victor LLP (57) ABSTRACT

Provided are techniques for viewing objects. A hierarchical structure is displayed, wherein the hierarchical structure includes two or more levels, and wherein each of the levels includes one or more objects. A control is provided to enable selection of one or more objects at each of the levels of the hierarchical structure. Selection of at least one object at each of two or more of the levels of the hierarchical structure is received. In response to receiving the selection, the hierarchical structure is displayed with the at least one object at each of the two or more of the levels shown as selected along with a list of the selected objects.

15 Claims, 9 Drawing Sheets

U.S. PATENT DOCUMENTS

| | | | |
|---|---|---|---|
| 2005/0071130 A1 | 3/2005 | Benjamin et al. | |
| 2005/0071780 A1* | 3/2005 | Muller et al. | 715/825 |
| 2005/0289394 A1* | 12/2005 | Arrouye et al. | 714/15 |
| 2006/0195462 A1* | 8/2006 | Rogers | 707/100 |
| 2006/0195512 A1* | 8/2006 | Rogers et al. | 709/203 |
| 2006/0195513 A1* | 8/2006 | Rogers et al. | 709/203 |
| 2006/0195514 A1* | 8/2006 | Rogers et al. | 709/203 |
| 2006/0195789 A1* | 8/2006 | Rogers et al. | 715/727 |
| 2007/0156677 A1 | 7/2007 | Szabo | |

OTHER PUBLICATIONS

Stern, Judith et al. "iTunes 6 and iPod for Windows and Macintosh: Visual Quickstart Guide". Peachpit Press, Dec. 2, 2005.*

Apple Computer, Inc., "Address Book", [online], [retrieved on Dec. 9, 2005], retrieved from the Internet at <URL: http://www.apple.com/macosx/features/addressbook/>.

Ascential Software, "IBM WebSphere Metastage", [online], 2005, [Retrieved on Sep. 12, 2005], retrieved from the Internet at <URL: http://www.ascential.com/products/aeip_metadata.html>.

Cheung, W. And C. Hsu, "The Model-Assisted Global Query System for Multiple Databases in Distributed Enterprises", *ACM Transaction on Information Systems,* vol. 14, No. 4, Oct. 1996, pp. 421-470.

Christodoulakis, S., M. Theodoridou, F. Ho, M. Papa, and A. Pathria, "Multimedia Document Preparation, Information Extraction, and Document Formation in MINOS: A Model and a System", *ACM Transactions on Office Information Systems,* vol. 4, No. 4, Oct. 1986, pp. 345-383.

Hertzum, M. and E. Frokjaer, "Browsing and Querying in Online Documentatino: A Study of User Interfaces and the Interaction Process", *ACM Transactions on Computer-Human Interaction,* vol. 3, No. 2, Jun. 1996, pp. 136-161.

Ivory, M.Y. and M.A. Hearst, "The State of the Art in Automating Usability Evaluation of User Interfaces", *ACM Computing Surveys,* vol. 33, No. 4, Dec. 2001, pp. 470-516.

US Patent Application, filed Sep. 12, 2005, entitled "User Interface Options of a Impact Analysis Tool", invented by M.W. Yaklin.

US Patent Application, filed Sep. 12, 2005, entitled "User Interface Options of a Data Lineage Tool", invented by N. Bobbin, Y. Youssef, and M.W. Yaklin.

Angewandte, A., "aiSee Graphic Visualization Software User Manual Window Version 2.1.60", [online], copyright Aug. 2002 and last modified Aug. 23, 2002, retrieved on the Internet at: URL: http://www.aisee.com/manual/windows/node54.html, 30 pp.

Darling, E., K. Recktenwald, N. Kalghatgi, & A. Burgman, "Effects of Fisheye on Visualizing Connections between Nodes", Conference on Human Factors in Computing Systems, 2005, pp. 1328-1330.

* cited by examiner

SELECTION AND DESELECTION OF OBJECTS AT MULTIPLE LEVELS OF A HIERARCHY

BACKGROUND

1. Field

Embodiments of the invention relate to selection and deselection of objects at multiple levels of a hierarchy.

2. Description of the Related Art

Conventional horizontal browse controls allow users to access large amounts of data through progressive disclosure in a horizontal, hierarchical manner. The horizontal browse controls are an alternative to the vertical, hierarchical tree displays output by many computer operating systems.

A hierarchical structure or hierarchy may be described as including one or more levels. Each level of the hierarchical structure includes one or more objects. In some hierarchical structures, a top-most object is called a root object, and the root object is the only object that has no parent. An object may have one or more child objects, also referred to as children, and the object is said to be a parent of the child objects. Objects without child objects may be called leaf objects or leaf nodes. The child objects may be objects themselves that have child objects.

Figure 1:
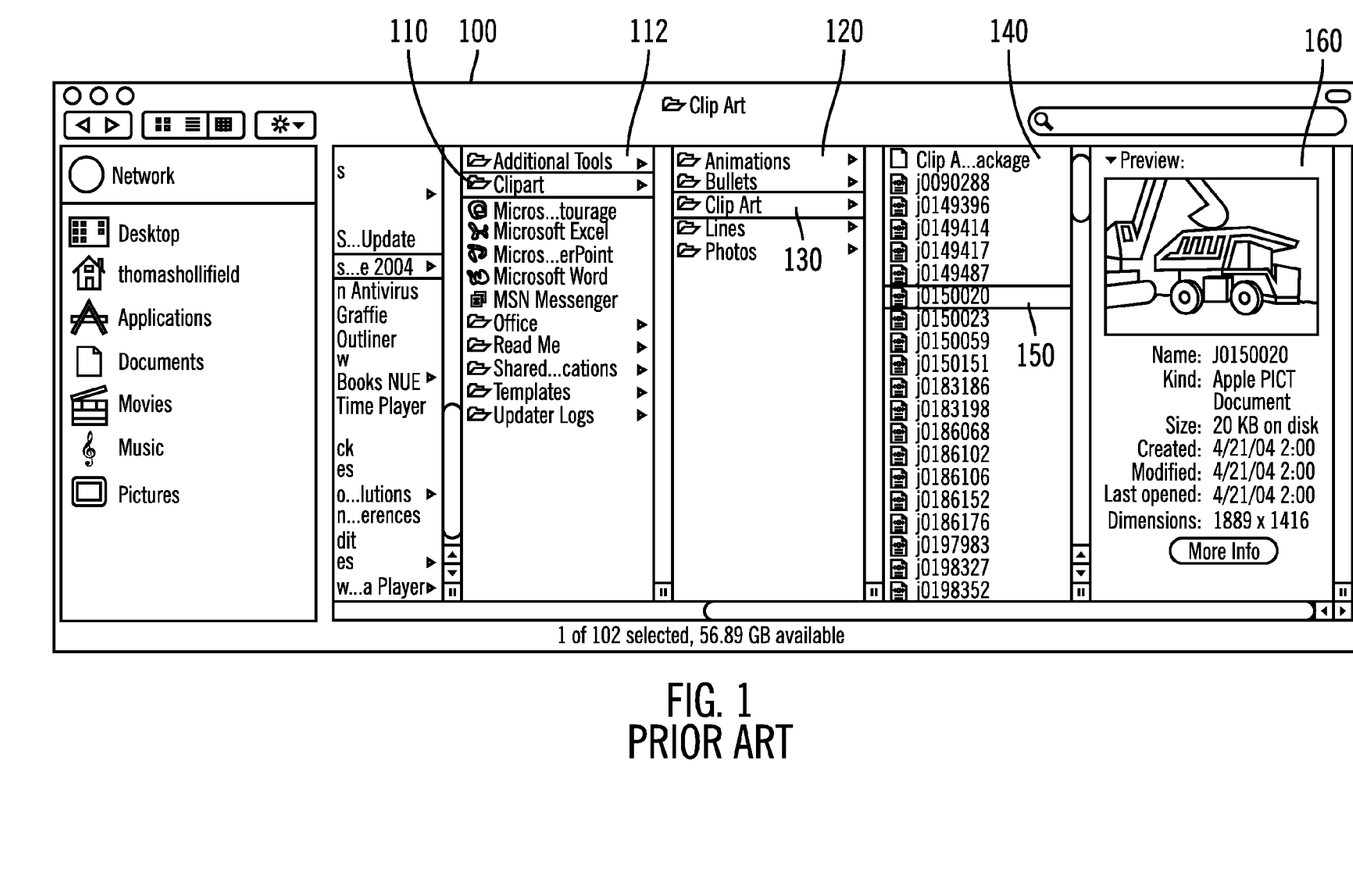
FIG. 1 illustrates a prior art horizontal browse control.

FIG. 1 illustrates a prior art horizontal browse control provided by an APPLE® operating system OSX available from Apple Computer, Inc. (APPLE is a trademark of Apple Computer, Inc. in the United States, other countries, or both). The horizontal browse control works by allowing selection of an object (e.g., a folder, a file, an application, etc.) in a panel, which then opens all the child objects in a panel to its immediate right. In this example, each panel represents a level of the hierarchy. A child object may itself be treated as on object that has further child objects. The user continues selecting objects and child objects until a desired object is found in the hierarchical structure, at which point a summary of the selected object appears in a far right panel. For example, in FIG. 1, the Clipart object 110 has been selected from panel 112, and child objects of the Clipart object 110 are listed in panel 120. From panel 120, the Clip Art object 130 has been selected, and child objects of the Clip Art object 130 are listed in panel 140. From panel 140, the j0150020 object 150 has been selected. There are no child objects for the j0150020 object 150. Therefore, when the j0150020 object 150 is selected, details of the j0150020 object 150 are shown in panel 160.

In such a solution, as the user drills down, the user only sees a single viewpoint into the hierarchical structure. In particular, selection of any object results in selection of all child objects. Additionally, multiple objects may be selected only in one level of the hierarchy at a given time. Thus, there is a need in the art for an improved browse control.

SUMMARY OF EMBODIMENTS OF THE INVENTION

Provided are a method, computer program product, and system for viewing objects. A hierarchical structure is displayed, wherein the hierarchical structure includes two or more levels, and wherein each of the levels includes one or more objects. A control is provided to enable selection of one or more objects at each of the levels of the hierarchical structure. Selection of at least one object at each of two or more of the levels of the hierarchical structure is received. In response to receiving the selection, the hierarchical structure is displayed with the at least one object at each of the two or more of the levels shown as selected along with a list of the selected objects

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments provide a way to easily manage selection and deselection of objects at multiple levels in a hierarchical structure using an improved hierarchical browse control. Although examples herein may refer to certain hierarchical structures (e.g., a horizontal hierarchical structure), embodiments are applicable to any type of hierarchical structure (e.g., a vertical hierarchical structure, such as a tree structure).

Figure 2:
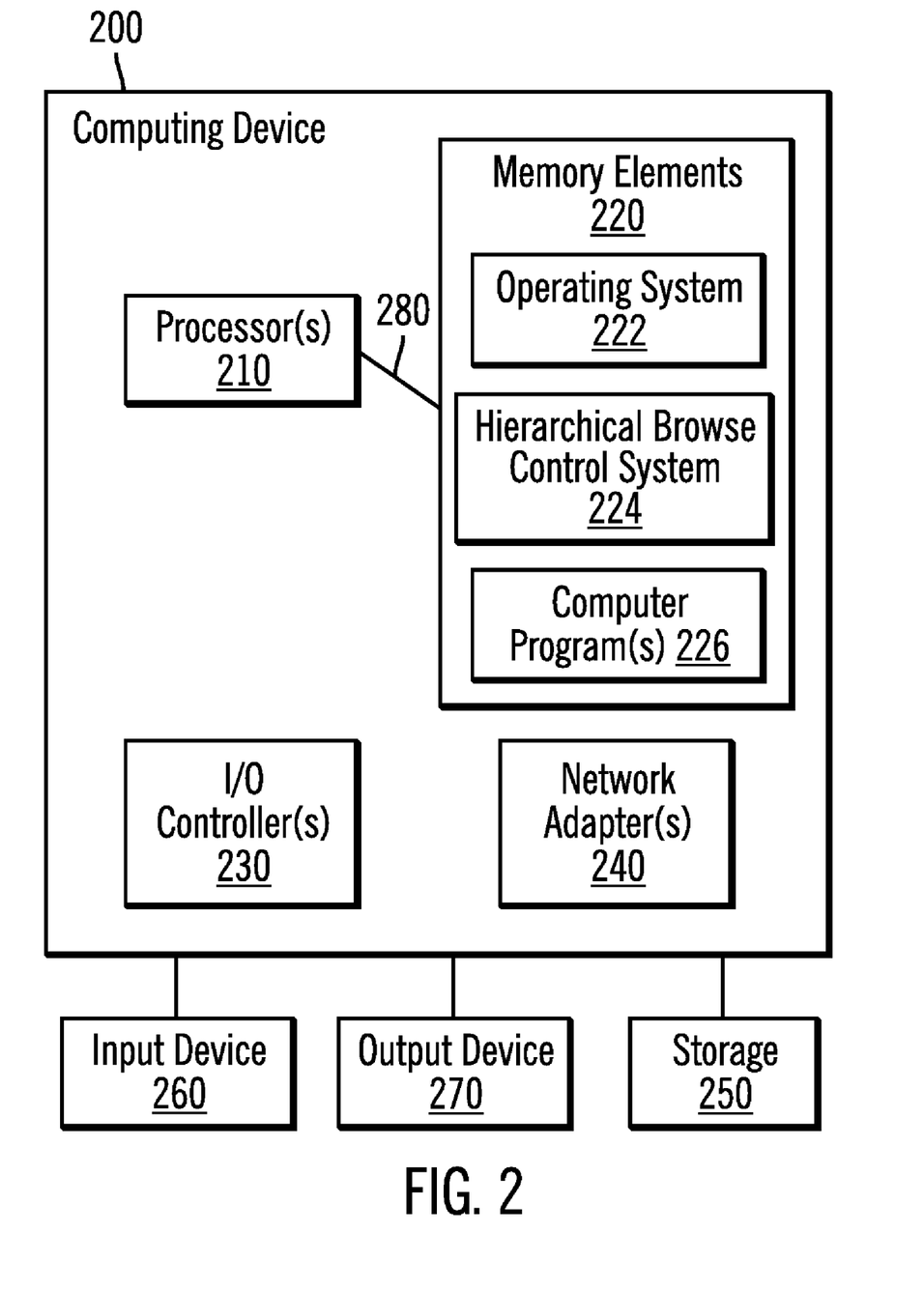
FIG. 2 illustrates details of a computing device in accordance with certain embodiments.

FIG. 2 illustrates details of a computing device 200 in accordance with certain embodiments. The computing device 200 is suitable for storing and/or executing program code and includes at least one processor 210 coupled directly or indirectly to memory elements 220 through a system bus 280. The memory elements 220 may include local memory employed during actual execution of the program code, bulk storage, and cache memories which provide temporary storage of at least some program code in order to reduce the number of times code must be retrieved from bulk storage during execution. The memory elements 220 include an operating system 222, a hierarchical browse control system 224, and one or more other computer programs 226. The hierarchical browse control system 224 enables browsing of a hierarchical structure. The hierarchical structure may be stored in memory 220 or storage 250.

Input/output or I/O devices 260, 270 (including but not limited to keyboards, displays, pointing devices, etc.) may be coupled to the system either directly or through intervening I/O controllers 230.

Network adapters 240 may also be coupled to the system to enable the data processing system to become coupled to other data processing systems or remote printers or storage devices through intervening private or public networks. Modems, cable modem and Ethernet cards are just a few of the currently available types of network adapters 240.

The computing device 200 may be coupled to storage 250 (e.g., a non-volatile storage area, such as magnetic disk drives, optical disk drives, a tape drive, etc.). The storage 230 may comprise an internal storage device or an attached or network accessible storage. Computer programs 226 in storage 230 may be loaded into the memory elements 220 and executed by a processor 210 in a manner known in the art.

The computing device 200 may include fewer components than illustrated, additional components not illustrated herein, or some combination of the components illustrated and additional components. The computing device 200 may comprise any computing device known in the art, such as a mainframe, server, personal computer, workstation, laptop, handheld computer, telephony device, network appliance, virtualization device, storage controller, etc.

The hierarchical browse control system 224 provides a user interface that enables selection and deselection of multiple objects at different levels of a hierarchical structure. The hierarchical browse control system 224 provides additional functions, such as enabling filtering of objects and selection of an object that displays contextual details about that object. The hierarchical browse control system 224 builds layers of interaction over the technique of selecting an object in a panel, which then opens the child objects of the selected object in another panel.

Figure 3A:
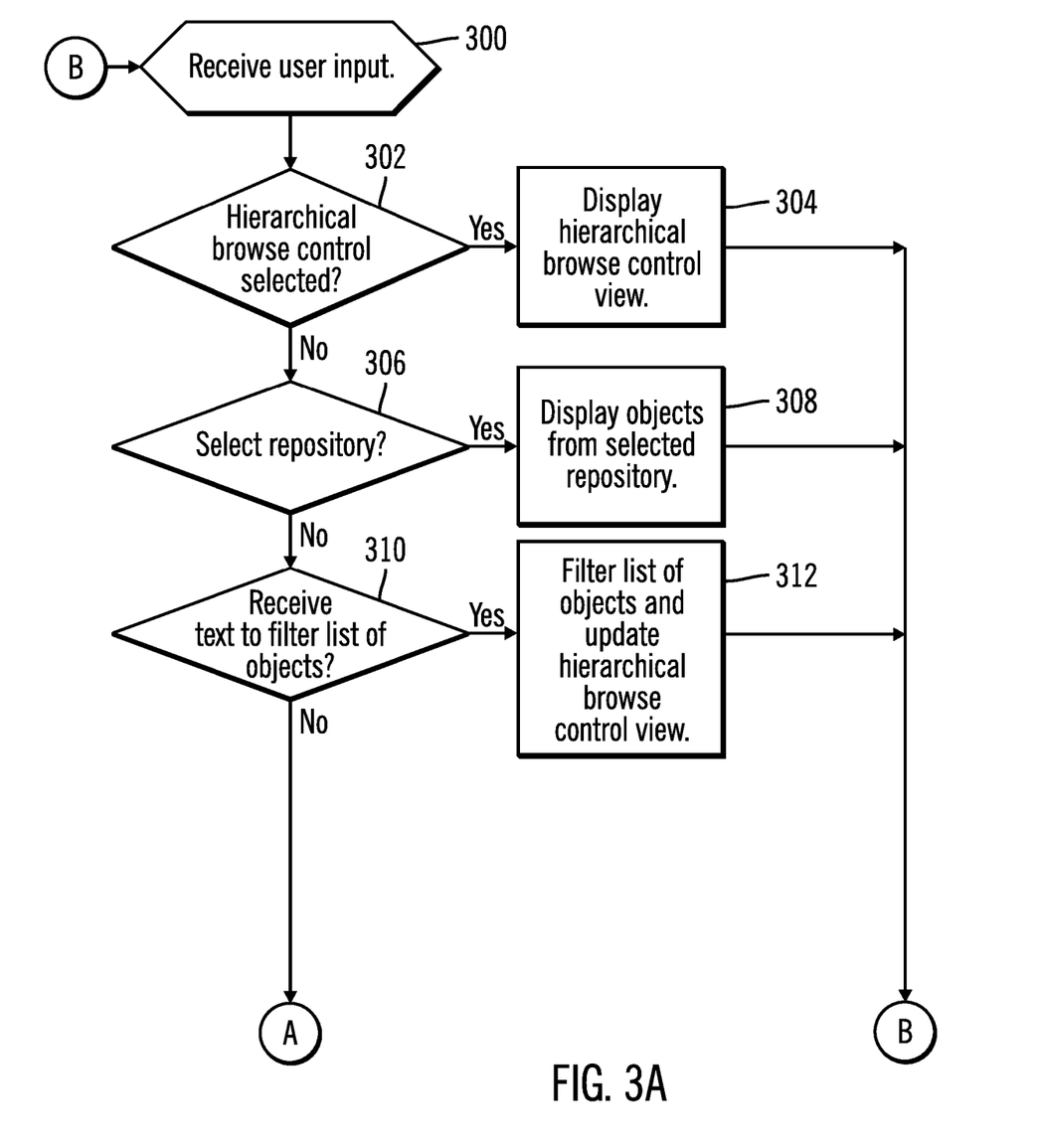
FIGS. 3A and 3B illustrate logic performed by the hierarchical browse control system in accordance with certain embodiments.
Figure 3B:
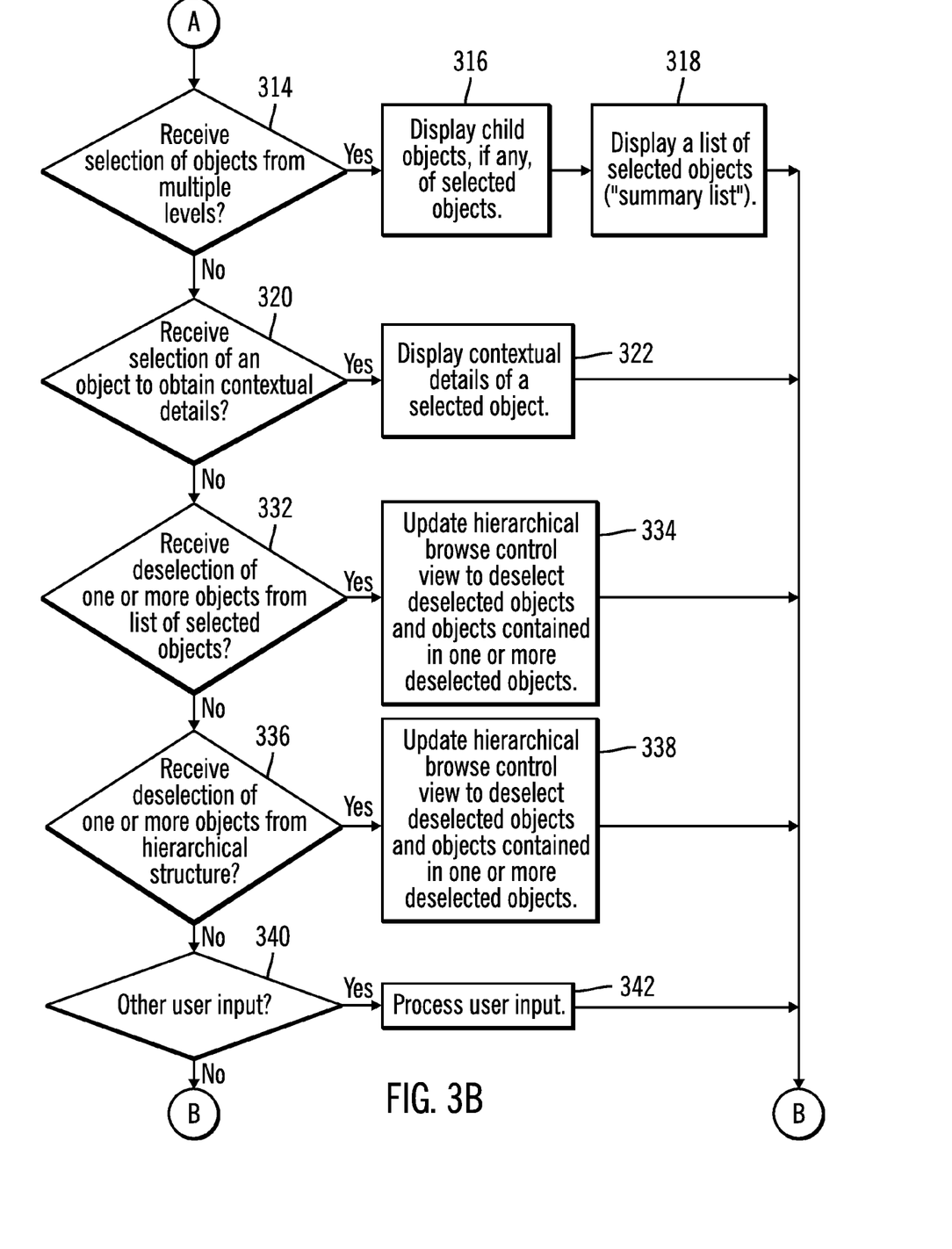
Figure 4:
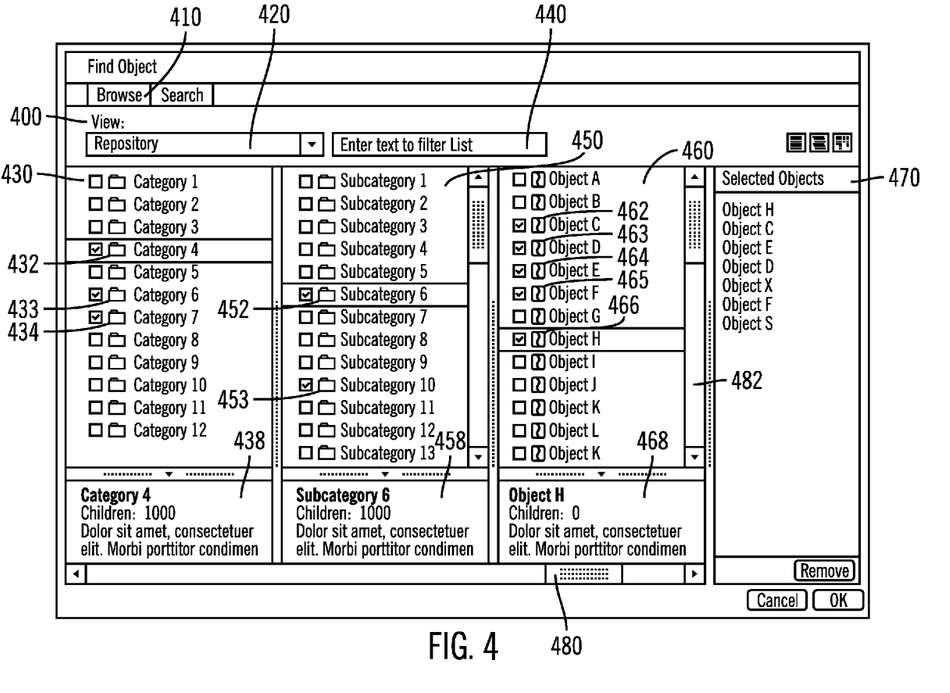
FIG. 4 illustrates a hierarchical browse control view in which objects at different levels are selected in accordance with certain embodiments.

FIGS. 3A and 3B illustrate logic performed by the hierarchical browse control system 224 in accordance with certain embodiments. Control begins at block 300 with the hierarchical browse control system 224 receiving user input. In block 302, the hierarchical browse control system 224 determines whether a hierarchical browse control provided by the hierarchical browse control system 224 has been selected. If so, processing continues to block 304, otherwise, processing continues to block 306. In block 304, the hierarchical browse control system 224 displays a hierarchical browse control view provided by the hierarchical browse control system 224. From block 304, processing continues to block 300. The hierarchical browse control view may be described as the output of the hierarchical browse control system 224. FIG. 4 illustrates a hierarchical browse control view 400 in which objects at different levels are selected in accordance with certain embodiments. In FIG. 4, the browse tab 410 has been selected, which results in the hierarchical browse control view 400 being displayed. The hierarchical browse control view 400 displays a hierarchical structure. The hierarchical structure may be displayed in different formats as indicated by view indicators.

In block 306, the hierarchical browse control system 224 determines whether a repository has been selected. The repository may be described as a source of a hierarchical structure that may be displayed in the hierarchical browse control view 400. If so, processing continues to block 308, otherwise, processing continues to block 310. In block 308, the hierarchical browse control system 224 displays objects from the selected repository. From block 308, processing continues to block 300. In FIG. 4, the repository is selected with a drop down list box 420 that is used to provide a name of a repository (e.g., "Repository") and the objects of a highest level in that repository are displayed in panel 430. In certain embodiments, the children of these objects from other levels of the hierarchical structure are not initially displayed. In other embodiments, the repository may be selected with controls other than the drop down list box 420. In various embodiments, different controls may be provided to enable selection of a repository.

In block 310, the hierarchical browse control system 224 determines whether text has been received to filter the objects in the hierarchical structure. If so, processing continues to block 312, otherwise, processing continues to block 314 (FIG. 3B). In block 312, the hierarchical browse control system 224 filters objects in the hierarchical structure in the hierarchical structure from a selected repository and updates the displayed hierarchical browse control view. From block 312, processing continues to block 300. Thus, the hierarchical browse control system 224 provides scoped filtering to the hierarchical structure. In FIG. 4, the text to filter the objects in the hierarchical structure may be entered in a text box 440. In other embodiments, the text to filter the objects in the hierarchical structure may be input with controls other than the text box 440. For example, if the text to filter is "11", then Category 11 and Subcategory 11 would be provided in a result list.

In block 314, the hierarchical browse control system 224 determines whether objects have been selected from multiple levels of the hierarchy. In certain embodiments, multiple objects may be selected by checking checkboxes associated with those objects. If so, processing continues to block 316, otherwise, processing continues to block 320. In block 316, the hierarchical browse control system 224 displays child objects, if any, of each of the selected objects (e.g., in an additional level panel). In block 318, the hierarchical browse control system 224 displays a list of selected objects (e.g., in a separate panel that may also referred to as a "summary panel"). The list of selected objects may also be referred to as a "summary list". The level panels are those that are not summary panels. From block 318, processing continues to block 300 (FIG. 3A).

For example, in FIG. 4, the hierarchical browse control system 224 displays a hierarchical browse control view 400 that includes level panels 430, 450, 460. Each level panel 430, 450, 460 displays a level of the hierarchical structure. In this example, multiple objects have been selected at each level. In level panel 430, a Category 4 object 432, a Category 6 object 433, and a Category 7 object 434 are selected. Level panel 450 displays the child objects of the objects selected in level panel 430. Similarly, level panel 460 displays child objects of the objects selected in level panel 450. Also, in level panel 450, a Subcategory 6 object 452 and a Subcategory 10 object 453 are selected. In level panel 460 an Object C object 462, an Object D object 463, an Object E object 464, an Object F object 465, and an Object H object 466 are selected. When one or more objects are selected from the hierarchical structure displayed in the hierarchical browse control view 400, the hierarchical browse control system 224 displays a list of selected objects in a another panel 470 (also referred to as a summary panel).

In block 320, the hierarchical browse control system 224 determines whether an object has been selected to obtain contextual details. In certain embodiments, the hierarchical browse control system 224 displays contextual details about an object in response to determining that the object has been highlighted. If so, processing continues to block 322, otherwise, processing continues to block 332. In block 322, the hierarchical browse control system 224 displays contextual details about a selected object. In certain embodiments the contextual details are listed in a collapsible pane at the bottom of a level panel in which the selected object is displayed. From block 322, processing continues to block 300 (FIG. 3A). In some embodiments, the hierarchical browse control system 224 discloses contextual details underneath each level panel. In FIG. 4, the Category 4 object 432 in level panel 430 is highlighted, and the hierarchical browse control system 224 displays contextual details 438 about the Category 4 object. The Subcategory 6 object 452 in level panel 450 is highlighted, and the hierarchical browse control system 224 displays contextual details 458 about the Subcategory 6 object. The Object H object 466 is selected, and the hierarchical browse control system 224 displays contextual details 468 about the Object H object 466. In this example, the Object H object 468 does not have any child objects. The scroll bar 480 may be used to scroll to portions of the hierarchical browse control view that are not visible, and scroll bars in each level panel (e.g., scroll bar 482) may be used to scroll through portions of the level of the hierarchical structure displayed in that level panel.

In block 332, the hierarchical browse control system 224 determines whether one or more objects have been deselected from a list of selected objects (i.e., a "summary list"). If so, processing continues to block 334, otherwise, processing continues to block 336. In block 334, the hierarchical browse control system 224 updates the hierarchical browse control view to deselect the deselected objects and objects contained in the one or more deselected objects. From block 334, processing continues to block 300 (FIG. 3A).

Figure 5:
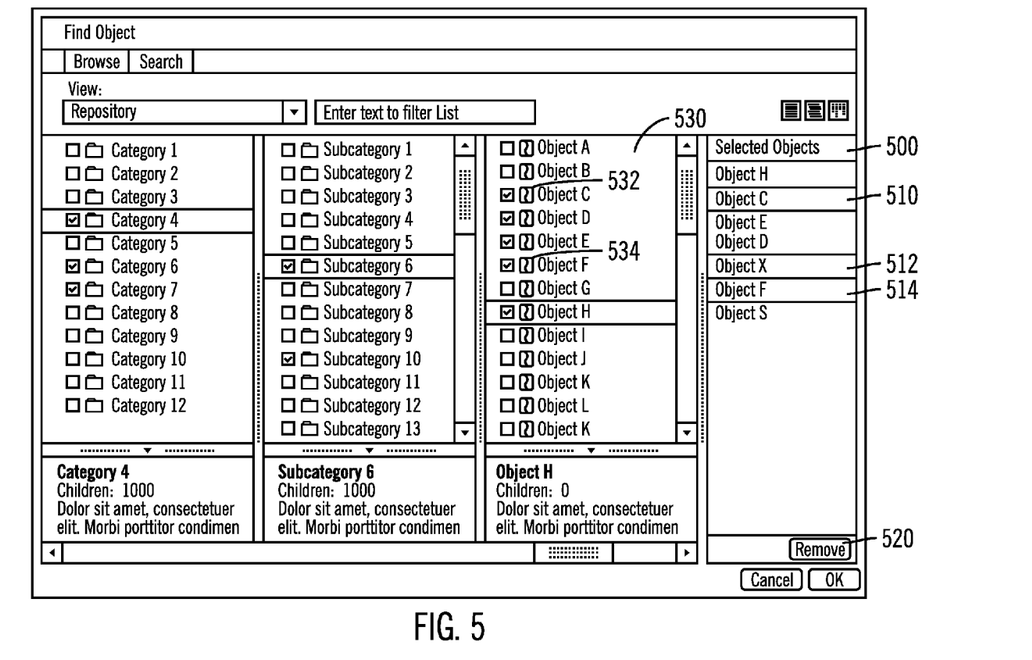
FIGS. 5 and 6 illustrate deselection of objects using a list of selected objects ("summary list") in accordance with certain embodiments.
Figure 6:
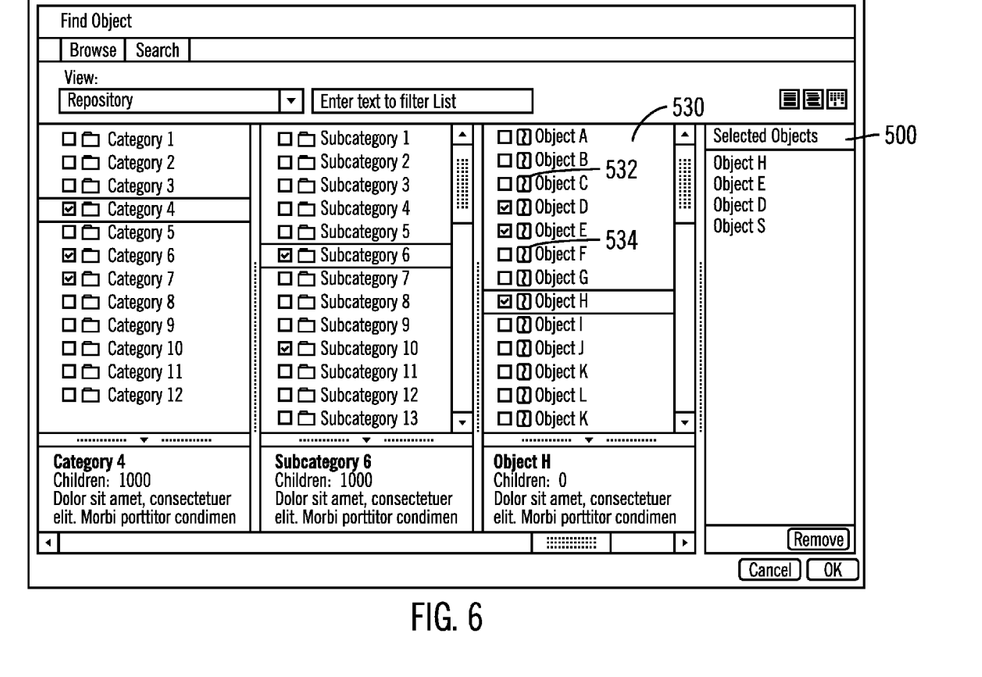

FIGS. 5 and 6 illustrate deselection of objects using a list of selected objects ("summary list") in accordance with certain embodiments. To avoid drilling down to each object in their various levels to deselect those objects, users may deselect objects (e.g., by unchecking appropriate check boxes) in the summary panel. In FIG. 5, Object C 510, Object X 512, and Object F 514 are selected from the summary panel 500. Currently, the corresponding objects, an Object C object 532, an Object X object (not visible in FIG. 5), and an Object F object 534 in level panel 530 have corresponding checkboxes checked (i.e., to indicate selection). Then, the remove button 520 is selected. In FIG. 6, in response to receiving the selection of objects 510, 512, 513 and selection of the remove button 520, the hierarchical browse control system 224 removes objects 510, 512, and 513 from the summary panel 500 and the checkboxes for the Object C object 532, the Object X object (not visible in FIG. 6), and the Object F object 534 in level panel 530 are unchecked (i.e., a form of deselection).

Figure 7:
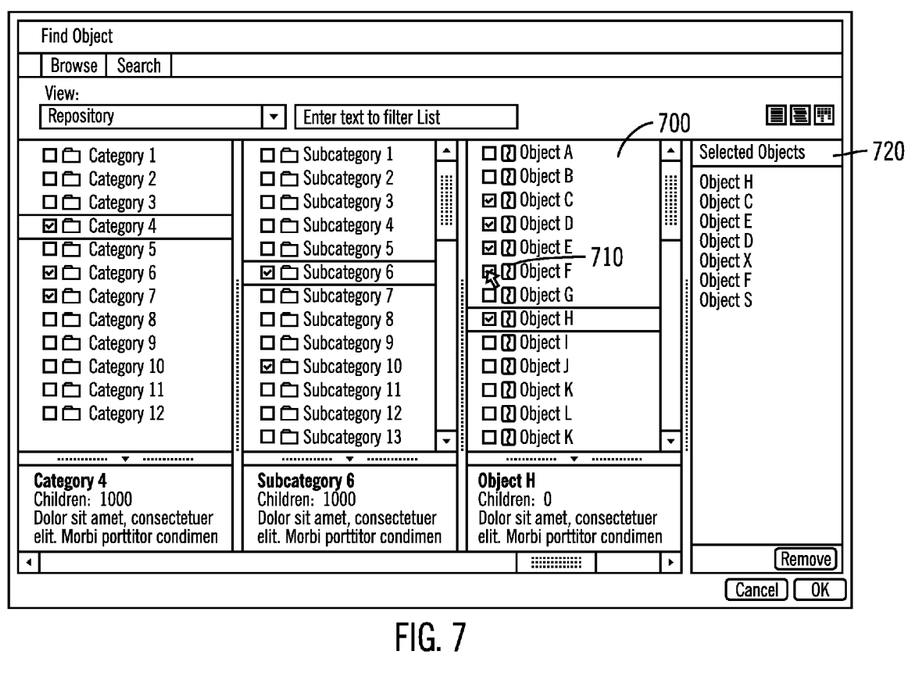
FIGS. 7 and 8 illustrate deselection of an object using a level panel in accordance with certain embodiments.
Figure 8:
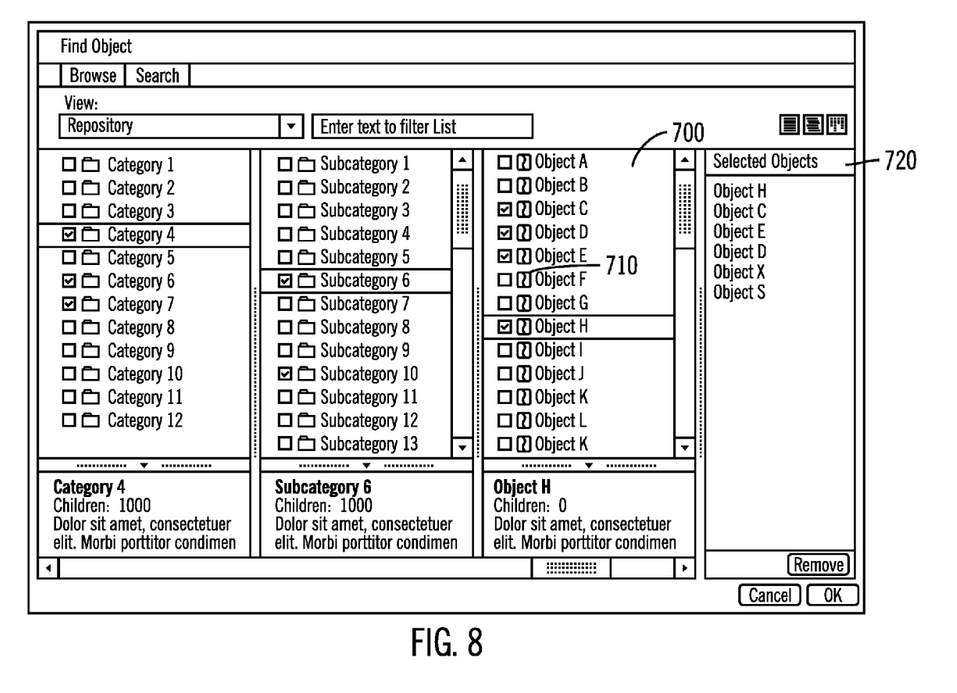

In block 336, the hierarchical browse control system 224 determines whether one or more objects have been deselected from the hierarchical structure (e.g., from one or more level panels rather than the summary list). If so, processing continues to block 338, otherwise, processing continues to block 340. In block 338, the hierarchical browse control system 224 updates the hierarchical browse control view to deselect the deselected objects and objects contained in the one or more deselected objects. From block 338, processing continues to block 300 (FIG. 3A). FIGS. 7 and 8 illustrate deselection of an object using a level panel in accordance with certain embodiments. In FIG. 7, an Object F object 710 is displayed in a level panel 700 and is displayed in a summary panel 720. In response to user input that removes the check in the checkbox associated with object 710, the hierarchical browse control system 224 updates a summary panel is updated to remove Object F from the list. FIG. 8 illustrates that the Object F object 710 does not have a check in an associated checkbox, and the summary panel 720 does not include Object F.

In block 340, the hierarchical browse control system 224 determines whether other user input has been received. If so, processing continues to block 342, otherwise, processing continues to block 300 (FIG. 3A). In block 342, the hierarchical browse control system 224 processes the user input. From block 342, processing continues to block 300 (FIG. 3A).

Thus, embodiments enable multiple selection of objects at different levels of the hierarchical structure and displays these selected objects in a summary panel. Embodiments also shows which levels of the hierarchical structure contain selected objects (e.g., .g. by displaying checkboxes that are checked for selected objects and indeterminate checkboxes for unselected parent objects that contain one or more (but not all) selected children). Moreover, users may easily deselect chosen objects from a summary panel, without having to drill into the various levels of the hierarchical structure to find and deselect the desired objects. Alternatively, users may deselect an object in a level of the hierarchy (e.g., by removing a check in a checkbox next to the object to be deselected), and embodiments deselect all objects contained in the deselected object without having the user drill to the bottom of the hierarchical structure.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or medium may be any apparatus that may contain, store, communicate, propagate, or transport the program for use by or in connection with the instruction execution system, apparatus, or device.

The described operations may be implemented as code maintained in a computer-usable or medium, where a processor may read and execute the code from the medium. The computer-usable medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, LEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, BLUETOOTH®, etc. (BLUETOOTH is a trademark of Bluetooth SIG, Inc. in the United States, other countries, or both). The transmission signals in which the code or logic is encoded is capable of being transmitted by a transmitting station and received by a receiving station, where the code or logic encoded in the transmission signal may be decoded and stored in hardware or a computer-readable medium at the receiving and transmitting stations or devices.

Thus, a computer program product may comprise computer usable or computer-readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, and/or combinations of software and hardware.

Certain embodiments may be directed to a method for deploying computing infrastructure by a person or automated processing integrating computer-readable code into a computing system, wherein the code in combination with the computing system is enabled to perform the operations of the described embodiments.

The logic of FIGS. 3A and 3B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3A and 3B may be implemented in software, hardware, programmable and non-programmable gate array logic or in some combination of hardware, software, or gate array logic.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method for viewing objects, comprising:
    displaying a hierarchical structure, wherein the hierarchical structure includes two or more levels, and wherein each of the levels includes two or more objects, and wherein the two or more objects for each of the levels is displayed in a separate level panel, wherein, when an object at a first level displayed in a first level panel has child objects at a second level, the child objects are displayed in a second level panel;
    for each object in a level panel that is selected to obtain contextual details, displaying the contextual details about the object below the level panel in which the object is displayed;
    providing a control to enable selection of two or more objects at each of the levels of the hierarchical structure;
    receiving selection of at least two objects at each of two or more of the levels of the hierarchical structure in at least two separate level panels;
    in response to receiving the selection,
        displaying the hierarchical structure with the at least two objects at each of the two or more of the levels shown as selected; and
        displaying a list of the selected objects in a summary panel; and in response to removing an object from the summary panel, deselecting the object in the level panel displaying that object.

2. The method of claim 1, further comprising:
    receiving deselection of multiple objects from the list of the selected objects in the summary panel; and
    updating the hierarchical structure to deselect the deselected multiple objects and objects contained in the one or more deselected objects.

3. The method of claim 1, further comprising:
    receiving deselection of one or more objects from the hierarchical structure; and
    removing the deselected one or more objects from the list of the selected objects in the summary panel.

4. The method of claim 1, further comprising:
    receiving selection of a repository that identifies a source of the hierarchical structure.

5. The method of claim 1, further comprising:
    in response to receiving text to filter objects in the hierarchical structure, filtering the objects; and
    updating the hierarchical structure to display the hierarchical structure based on the filtered objects.

6. A computer program product for viewing objects comprising a computer-readable medium storing a computer-readable program, wherein the computer-readable program is executed by a processor on a computer and causes the computer to:
    display a hierarchical structure, wherein the hierarchical structure includes two or more levels, and wherein each of the levels includes two or more objects, and wherein the two or more objects for each of the levels is displayed in a separate level panel, wherein, when an object at a first level displayed in a first level panel has child objects at a second level, the child objects are displayed in a second level panel;
    for each object in a level panel that is selected to obtain contextual details, display the contextual details about the object below the level panel in which the object is displayed;
    provide a control to enable selection of two or more objects at each of the levels of the hierarchical structure;
    receive selection of at least two objects at each of two or more of the levels of the hierarchical structure in at least two separate level panels;
    in response to receiving the selection,
        display the hierarchical structure with the at least two objects at each of the two or more of the levels shown as selected; and
        display a list of the selected objects in a summary panel; and
    in response to removing an object from the summary panel, deselecting the object in the level panel displaying that object.

7. The computer program product of claim 6, wherein the computer-readable program when executed on a computer causes the computer to:
    receive deselection of multiple objects from the list of the selected objects in the summary panel; and
    update the hierarchical structure to deselect the deselected multiple objects and objects contained in the one or more deselected objects.

8. The computer program product of claim 6, wherein the computer-readable program when executed on a computer causes the computer to:
  receive deselection of one or more objects from the hierarchical structure; and
  remove the deselected one or more objects from the list of the selected objects in the summary panel.

9. The computer program product of claim 6, wherein the computer-readable program when executed on a computer causes the computer to:
  receive selection of a repository that identifies a source of the hierarchical structure.

10. The computer program product of claim 6, wherein the computer-readable program when executed on a computer causes the computer to:
  in response to receiving text to filter objects in the hierarchical structure, filter the objects; and
  update the hierarchical structure to display the hierarchical structure based on the filtered objects.

11. A system for viewing objects, comprising:
  a computer screen; and
  hardware logic capable of performing operations, the operations comprising:
    displaying a hierarchical structure on the computer screen, wherein the hierarchical structure includes two or more levels, and wherein each of the levels includes two or more objects, and wherein the two or more objects for each of the levels is displayed in a separate level panel, wherein, when an object at a first level displayed in a first level panel has child objects at a second level, the child objects are displayed in a second level panel;
    for each object in a level panel that is selected to obtain contextual details, displaying the contextual details about the object below the level panel in which the object is displayed
    providing a control to enable selection of two or more objects at each of the levels of the hierarchical structure;
    receiving selection of at least two objects at each of two or more of the levels of the hierarchical structure in at least two separate level panels;
    in response to receiving the selection,
      displaying the hierarchical structure with the at least two objects at each of the two or more of the levels shown as selected; and
      displaying a list of the selected objects in a summary panel; and
    in response to removing an object from the summary panel, deselecting the object in the level panel displaying that object.

12. The system of claim 11, wherein the operations further comprise:
  receiving deselection of multiple objects from the list of the selected objects in the summary panel; and
  updating the hierarchical structure to deselect the deselected multiple objects and objects contained in the one or more deselected objects.

13. The system of claim 11, wherein the operations further comprise:
  receiving deselection of one or more objects from the hierarchical structure; and
  removing the deselected one or more objects from the list of the selected objects in the summary panel.

14. The system of claim 11, wherein the operations further comprise:
  receiving selection of a repository that identifies a source of the hierarchical structure.

15. The system of claim 11, wherein the operations further comprise:
  in response to receiving text to filter objects in the hierarchical structure, filtering the objects; and
  updating the hierarchical structure to display the hierarchical structure based on the filtered objects.

* * * * *